United States Patent
Sugawara

(10) Patent No.: US 7,273,915 B2
(45) Date of Patent: Sep. 25, 2007

(54) CROSSLINKABLE RESIN COMPOSITION AND RESIN FORMED BODY PRODUCED THEREFROM

(75) Inventor: Tomoo Sugawara, Tokyo (JP)

(73) Assignee: Zeon Corporation, Tokyo (JP)

(*) Notice: Subject to any disclaimer, the term of this patent is extended or adjusted under 35 U.S.C. 154(b) by 0 days.

(21) Appl. No.: 10/567,782

(22) PCT Filed: Aug. 13, 2004

(86) PCT No.: PCT/JP2004/011939

§ 371 (c)(1),
(2), (4) Date: Feb. 9, 2006

(87) PCT Pub. No.: WO2005/017033

PCT Pub. Date: Feb. 24, 2005

(65) Prior Publication Data

US 2006/0205901 A1    Sep. 14, 2006

(30) Foreign Application Priority Data

Aug. 13, 2003  (JP) ............................. 2003-292895

(51) Int. Cl.
*C08G 61/06* (2006.01)
*C08K 9/12* (2006.01)

(52) U.S. Cl. ..................... 526/308; 526/281; 526/282; 526/283; 526/902; 523/211; 427/385.5; 428/396; 264/236; 264/331.15

(58) Field of Classification Search ............... 526/281, 526/282, 283, 902, 308; 427/385.5; 428/396; 264/236, 331.15; 523/211
See application file for complete search history.

(56) References Cited

U.S. PATENT DOCUMENTS

| 5,204,427 A | | 4/1993 | Torii et al. |
| 5,728,785 A | * | 3/1998 | Grubbs et al. ............... 526/142 |
| 6,020,443 A | * | 2/2000 | Woodson et al. ........... 526/135 |
| 7,025,851 B2 | * | 4/2006 | Caster et al. ............ 156/306.9 |

FOREIGN PATENT DOCUMENTS

| FR | 2 124 263 A | 9/1972 |
| JP | 1-204924 A | 8/1989 |
| JP | 3-115428 A | 5/1991 |
| JP | 3-146516 A | 6/1991 |
| JP | 5-209128 A | 8/1993 |
| JP | 2000-72859 A | 3/2000 |
| WO | WO-98/05715 | 2/1998 |

* cited by examiner

*Primary Examiner*—Fred Teskin
(74) *Attorney, Agent, or Firm*—Birch, Stewart, Kolasch & Birch, LLP

(57) ABSTRACT

A crosslinkable resin composition is provided which can be a forming material having excellent adhesion to metals and excellent heat resistance. The crosslinkable resin composition comprises; a cycloolefin resin (A) obtained through metathesis polymerization of a cycloolefin monomer in the presence of a compound having two or more vinyl groups in the molecule, and a radical generating agent (B). A crosslinked resin molded product is obtained by crosslinking such a crosslinkable resin composition through heating.

7 Claims, No Drawings

CROSSLINKABLE RESIN COMPOSITION AND RESIN FORMED BODY PRODUCED THEREFROM

TECHNICAL FIELD

The invention relates to a crosslinkable resin composition and a molded product from the same, and in particular, to a crosslinked resin molded product made from a cycloolefin resin excellent in heat resistance, to a crosslinkable resin composition excellent in fluidity and capable of providing a crosslinked resin molded product and a molded product from the same.

BACKGROUND ART

Since a cycloolefin resin obtained by polymerizing polymerizable monomers including a cycloolefin monomer in the presence of a metathesis polymerization catalyst is excellent in electric characteristics, mechanical characteristics, impact resistance, weather resistance and the like, the resin has been in progress on the way to practical applications of molded products in wide open fields.

A cycloolefin resin has been preferably employed as an electric insulating material of a printed wiring board or the like due to its excellency in electric characteristics. In recent years, the printed wiring board has been multilayered and high-density. When a wiring layer of such printed wiring board is formed with a solder or the like, an electric insulating material requires solder dip resistance. The solder used for forming the wiring layer is desirably of a lead free material from the viewpoint of environmental safety. Since the lead free solder contains a metal higher in melting point than lead, requirement for heat resistance of an electric insulating layer has further enhanced.

For instance, disclosed in WO 98/05715 A1 is a crosslinked resin molded product excellent in heat resistance obtained in a procedure in which a crosslinkable resin composition containing a thermoplastic norbornene resin, an organic peroxide and a crosslinking assistant is dissolved into a proper solvent if necessary, the composition is molded into a film or a prepreg, which is a resin molded product, then, the film or the like is laminated on a substrate such as a metal foil, and thereafter the laminate is heat-press molded, crosslinked and heat fused.

Submitted in Japanese Patent Application Laid-Open No. 2000-72859 is a suggestion that in a polymerization of a cycloolefin monomer in the presence of a metathesis polymerization catalyst, a compound having one vinyl group in the molecule such as a styrene derivative is mixed in the monomer for the purpose of adjusting a molecular weight.

DISCLOSURE OF THE INVENTION

The present inventor has found that the adherence of laminated prepregs containing much of filler is lowered when the resin molded product (prepreg) is produced by mixing a filler into a crosslinkable resin composition, as disclosed in WO 98/05715 A1, containing a resin, a peroxide and a crosslinking assistant. The present inventor has confirmed that this phenomenon is caused by insufficiency of fluidity, when being heated, of the resin composition impregnated in the prepreg. Though it is possible to improve the fluidity by lowering the molecular weight of the resin, it causes the deterioration of heat resistance of the molded product such as prepreg. That is, in a conventional technology, it is difficult to achieve a good balance between fluidity of the crosslinkable resin composition and heat resistance of the molded product.

The present inventor has investigated through extensive studies based on the findings and knowledge in order to obtain a crosslinkable resin composition excellent in fluidity, capable of providing a resin molded product and a crosslinked resin molded product excellent in heat resistance (hereinafter, may collectively referred to as a "molded product"). As a result, the inventor found that fluidity of the crosslinkable resin composition and heat resistance of the molded product can be compatible with each other by using a compound having two or more vinyl groups in the molecule as a chain transfer agent, based on which the invention has been led to completion.

According to the invention, there is provided a crosslinkable resin composition containing; a cycloolefin resin (A) obtained by ring-opening metathesis polymerizing a cycloolefin monomer in the presence of a compound having two or more vinyl groups in a molecule, and a radical generating agent (B). Further, according to the invention, there is provided a resin molded product made of the crosslinkable resin composition. Still further, according to the invention, there is provided a crosslinked molded product obtained by heating and crosslinking the resin molded product.

According to the invention, there is provided a crosslinkable resin composition excellent in fluidity and capable of providing a crosslinked cycloolefin resin molded product excellent in heat resistance.

BEST MODE FOR CARRYING OUT THE INVENTION

A crosslinkable resin composition of the invention contains a cycloolefin resin (A) and a radical generating agent (B).

The cycloolefin resin (A) used in the invention is obtained by ring-opening polymerizing a polymerizable composition containing a cycloolefin monomer, a metathesis polymerization catalyst and a compound having two or more vinyl groups. In particular, ring-opening bulk polymerization using a polymerizable composition containing a radical generating agent (B) is preferable since it produces a crosslinkable resin composition of the invention at the same time as a resin production. Such a process is not only excellent in productivity but the crosslinkable composition also shows a good physical property.

The cycloolefin monomer used in producing the cycloolefin resin (A) is an olefin having an alicyclic structure in the molecule. Alicyclic structures include: a monocyclic structure, a polycyclic structure, a condensed polycyclic structure, abridged cyclic structure and a polycyclic structure as a combination thereof. The number of carbon atoms constituting the alicyclic structure is not particularly limited, but is usually in the range of 4 to 30, preferably 5 to 20, more preferably 5 to 15.

Examples of the cycloolefin monomer include monocycloolefin monomers and norbornene monomers (dicyclopentadienes, tetracyclododecenes, norbornenes and the like). These compounds may be substituted with a hydrocarbon group such as an alkyl group, an alkenyl group, an alkylidene group or an aryl group; or a polar group. The cycloolefin may have another double bond in addition to the double bond in the norbornene ring.

Examples of monocycloolefin monomers include: cyclobutene, cyclopentene, cyclooctene, cyclododecene and 1,5-cyclooctadiene.

Specific examples of norbornene monomer include: dicyclopentadienes such as dicyclopentadiene, methyldicyclopentadiene;

tetracyclododecenes such as tetracyclo[6.2.1.1$^{3,6}$.0$^{2,7}$]dodec-4-ene, 9-ethylidenetetracyclo[6.2.1.1$^{3,6}$.0$^{2,7}$]dodec-4-ene, 9-phenyltetracyclo[6.2.1.1$^{3,6}$.0$^{2,7}$]dodec-4-ene, tetracyclo[6.2.1.1$^{3,6}$.0$^{2,7}$]dodec-9-ene-4-carboxylic acid, tetracyclo[6.2.1.1$^{3,6}$.0$^{2,7}$]dodec-9-ene-4,5-dicarboxylic anhydride;

norbornenes such as 2-norbornene, 5-ethylidene-2-norbornene, 5-vinyl-2-norbornene, 5-phenyl-2-norbornene, acrylic acid 5-norbornen-2-yl, methacrylic acid 5-norbornen-2-yl, 5-norbornene-2-carboxylic acid, 5-norbornene-2,3-dicarboxylic acid, 5-norbornene-2,3-dicarboxylic anhydride;

oxanorbornenes such as 7-oxa-2-norbornene and 5-ethylidene-7-oxa-2-norbornene; and cycloolefins each having 4 or more rings such as tetracyclo[9.2.1.0$^{2,10}$.0$^{3,8}$]tetradeca-3,5,7,12-tetraene (also referred to as 1,4-methano-1,4,4a,9a-tetrahydro-9H-fluorene), pentacyclo[6.5.1.1$^{3,6}$.0$^{2,7}$.0$^{9,13}$]pentadeca-4,10-diene and pentacyclo[9.2.1.1$^{4,7}$.0$^{2,10}$.0$^{3,8}$]pentadeca-5,12-diene.

The use of the cycloolefin monomer, which is a hydrocarbon having no polar group, secures low dielectric loss tangent.

Of the above cycloolefin monomers, the norbornene monomer having a vinyl group, a methacryloyl group or an acryloyl group such as 9-vinyltetracyclo[6.2.1.1$^{3,6}$.0$^{2,7}$]dodec-4-ene, 5-vinyl-2-norbornene, methacrylic acid 5-norbornen-2-yl or acrylic acid 5-norbornen-2-yl is used 0.1% by weight or more in content relative to all cycloolefin monomers to thereby increase radical crosslinking reactivity and to improve heat resistance of the crosslinked resin molded product of the invention. Especially, when the crosslinked resin molded product of the invention is used as an electric insulating material for a high frequency signal, the norbornene monomer having a vinyl group such as 9-vinyltetracyclo[6.2.1.1$^{3,6}$.0$^{2,7}$]dodec-4-ene or 5-vinyl-2-norbornene is preferably blended, since low dielectric loss tangent is obtained.

The cycloolefin monomers can be used either alone or in combination of two or more kinds.

The compound having two or more vinyl groups in the molecule used in the invention functions as a chain transfer agent.

Specific examples thereof include: hydrocarbon compounds such as 1,4-pentadiene, 1,5-hexadiene, 1,6-heptadiene, 3,3-dimethyl-1,4-pentadiene, 3,5-dimethyl-1,6-heptadiene, 3,5-dimethoxy-1,6-heptadiene, 1,2-divinylcycloexane, 1,3-divinylcyclohexane, 1,4-divinylcyclohexane, 1,2-divinylbezene, 1,3-divinylbezene, 1,4-divinylbezene, divinylcyclopentane, diallylbenzene, divinylnaphthalene, divinylanthracene, divinylphenanthrene, trivinylbenzene and polybutadiene (including 1,2-addition ratio 10% or more); and compounds having a hetero atom such as diallyl ether, 1,5-hexadien-3-one, diallyl maleate, diallyl oxalate, dially malonate, dially succinate, dially glutarate, dially adipate, diallyphthalate, dially fumarate, diallyterephthalate, trially cyanurate, triallyisocyanurate, divinyl ether, allylvinyl ether, divinyl maleate, divinyl oxalate, divinyl malonate, divinyl succinate, divinyl glutarate, divinyl adipate, divinyl phthalate, divinyl fumarate, divinyl terephthalae, trivinyl cyanurate and trivinyl isocyanurate.

Among the compounds having two or more vinyl groups in the molecule, when the hydrocarbon compound having no hetero atom such as an oxygen atom, a nitrogen atom or a sulfur atom is used, the crosslinked resin molded product of the invention is low in electric characteristic value such as a dielectric constant and dielectric loss tangent. The crosslinked resin molded product is preferable for an electric insulating material for high frequency signal.

It is thought that the metathesis polymerization reaction of the cycloolefin monomer conducted in the presence of the compound having two or more vinyl groups in the molecule provides the polymer with vinyl groups introduced to both terminals thereof. It is thought that since the introduced vinyl group has a large radical reactivity, it accelerates a radical crosslinking reaction.

The amount of the compound having two or more vinyl groups in the molecule is usually in the range of from 0.1 to 10 parts by weight and preferably in the range of from 0.5 to 5 parts by weight relative to 100 parts by weight of the cycloolefin monomer. If the amount is too low, the cycloolefin resin (A) results in excessively higher in molecular weight, leading to a tendency of reducing fluidity in melting of the crosslinkable resin composition obtained. If the amount is too high, the crosslinked resin molded product tends to decrease its heat resistance and mechanical characteristics.

A different chain transfer agent can be used together with the compound having two or more vinyl groups in the molecule described above. The different chain transfer agent includes, for example, a compound having only one vinyl group in the molecule. Specific examples thereof include: aliphatic olefins such as 1-hexene and 2-hexene, aromatic olefins such as styrene and allybenzene; alicyclic olefins such as vinylcyclohexane; and vinyl ethers such as ethyl vinyl ether. The amount of the compound having only one vinyl group in the molecule is usually 50 mol % or less, preferably 40 mol % or less, more preferably 30 mole % or less and still more preferably 10 mol % or less relative to the compound having two or more vinyl groups in the molecule.

The metathesis polymerization catalyst used in the invention is not particularly limited insofar as it enables the ring-opening metathesis polymerization of the cycloolefin monomer.

The metathesis polymerization catalyst includes a complex having a transition metal atom as a central atom to which a plurality of ions, atoms, multi-atom ions and/or compounds are bonded. The transition metal atoms include: atoms of groups 5, 6 and 8 of a periodic table (long periodic-type, which also applies in later description). The atom in respective groups is not particularly limited, and the examples thereof are tantalum in Group 5, molybdenum or tungsten in Group 6 and ruthenium or osmium in Group 8.

Among them, preferable is the complex of ruthenium or osmium in group 8 to be used as the metathesis polymerization catalyst and more preferable is a ruthenium carbene complex. The ruthenium carbene complex allows high ring-opening polymerization reaction ratio of the polymerizable composition because of its excellency in catalytic activity, thereby exhibits excellent productivity of the crosslinkable resin composition. Further, the resin molded product obtained is less smelly (originating from unreacted cyclic olefin). The ruthenium carbene complex is relatively stable to oxygen and water in air and hardly inactivated, to make its production of the crosslinkable resin composition under the atmospheric conditions.

The ruthenium carbene complex is a complex compound represented by the following formula (1) or (2):

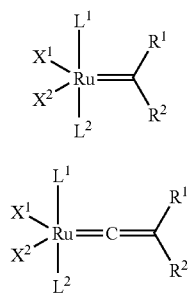

In the formulae (1) and (2), R¹ and R² may be the same or different, and each represents a hydrogen atom, a halogen atom, or a hydrocarbon group having 1 to 20 carbon atoms optionally containing a halogen atom, an oxygen atom, a nitrogen atom, a sulfur atom, a phosphorus atom or a silicon atom. X¹ and X² may be the same or different, and each represents an arbitrary anionic ligand. L¹ and L² may be the same or different, and each represents a heteroatom-containing carbene compound or a neutral electron-donating compound. R¹, R², X¹, X², L¹ and L² may be bonded to one another in an arbitrary combination to form a multidentate chelate ligand.

The hetero atom means an atom in groups 15 or 16 of the periodic table, examples of hetero atoms include: atoms of N, O, P, S, As and Se. Among them, preferable are atoms of N, O, P, S, and especially preferable is N atom from the viewpoint of obtaining the stable carbene compound.

The heteroatom-containing carbene compound preferably has heteroatoms bonded to, and adjacent to, both sides of a carbene atom, and more preferably has a heterocycle constituted by containing a carbene carbon atom and heteroatoms in both sides of the carbene carbon atom. Preferably, the heteroatoms adjacent to the carbene carbon atom have a bulky substituent group bonded thereto.

Examples of the heteroatom-containing carbene compound include compounds represented by the following formulae (3) or (4):

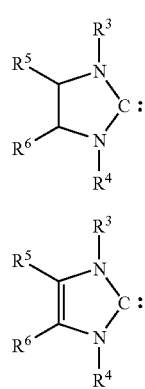

wherein R³ to R⁶ may be the same or different, and each represent a hydrogen atom, a halogen atom, or a hydrocarbon group having 1 to 20 carbon atoms optionally containing a halogen atom, an oxygen atom, a nitrogen atom, a sulfur atom, a phosphorus atom or a silicon atom, and R³ to R⁶ may be bonded to each other in an arbitrary combination to form a ring.

In the formulae (1) and (2), each of the anionic ligands X¹ and X² is a ligand to be negatively charged upon removal from the central metal, and examples thereof include halogen atoms such as F, Cl, Br and I, a diketonate group, substituted cyclopentadienyl group, alkoxyl group, aryloxy group and carboxyl group. Among these groups, a halogen atom is preferable, and a chlorine atom is more preferable.

In the formulae (1) and (2), the neutral electron-donating compound used as L¹ or L² may be any ligand to have neutral charge upon removal from the central metal. Specific examples thereof include carbonyl, amines, pyridines, ethers, nitrites, esters, phosphines, thioethers, aromatic compounds, olefins, isocyanides, and thiocyanates. Among these compounds, phosphines, ethers and pyridines are preferable, and trialkyl phosphine is more preferable.

Examples of complex compounds represented by the formula (1) include: ruthenium complex compounds wherein L¹ and L² are the heteroatom-containing carbene compound and the neutral electron-donating compound respectively such as benzilidene (1,3-dimesitylimidazolidin-2-ylidene)(tricyclohexylphosphine)ruthenium dichloride, (1,3-dimesitylimidazolidin-2-ylidene)(3-methyl-2-buten-1-ylidene)(tricyclopentylphosphine)ruthenium dichloride, benzilidene(1,3-dimesityl-2,3-dihydrobenzimidazol-2-ylidene)(tricyclohexylphosphine)ruthenium dichloride;

ruthenium complex compounds wherein L¹ and L² are both neutral electron-donating compounds such as benzylidenebis(tricyclohexylphosphine)ruthenium dichloride and (3-methyl-2-buten-1-ylidene)bis(tricyclopentylphosphine)ruthenium dichloride; and ruthenium complex compounds wherein L¹ and L² are both hetero atom-containing carbene compounds such as benzylidenebis(1,3-dicyclohexylimidazolidin-2-ylidene)ruthenium dichloride and benzylidenebis(1,3-diisopropyl-4-imidazolin-2-ylidene)ruthenium dichloride.

Specific examples of compounds represented by the formulae (3) and (4) include: 1,3-dimesitylimidazolidin-2-ylidene, 1,3-dimesityl-4-imidazolin-2-ylidene, 1,3-di(1-phenylethyl)-4-imidazolin-2-ylidene, 1,3-dimesithyl-2,3-dihydrobenzimidazol-2-ylidene.

In addition to the compounds represented by the formulae (3) and (4), it is also possible to employ, as the hetero atom-containing carbene compounds, 1,3,4-triphenyl-2,3,4,5-tetrahydro-1H-1,2,4-triazol-5-ylidene, 1,3,4-triphenyl-4,5-dihydro-1H-1,2,4-triazol-5-ylidene and the like.

These ruthenium complex compounds can be produced by methods described in, for example, Organic Letters, vol. 1, p. 953 (1999) and Tetrahedron Letters, vol. 40, p. 2247 (1999).

The amount of the metathesis polymerization catalyst, in terms of the molar ratio of (metal atom in the catalyst: cycloolefin monomer), is usually in the range of 1:2,000 to 1:2,000,000, preferably 1:5,000 to 1:1,000,000, more preferably 1:10,000 to 1:500,000.

The metathesis polymerization catalyst can be used if necessary in the form of a solution or a suspension in a small amount of an inert solvent. The solvent includes, for example, acyclic aliphatic hydrocarbons such as n-pentane, n-hexane, n-heptane, liquid paraffin, and mineral spirit; alicyclic hydrocarbons such as cyclopentane, cyclohexane, methyl cyclohexane, dimethyl cyclohexane, trimethyl cyclohexane, ethyl cyclohexane, diethyl cyclohexane, decahydronaphthalene, dicycloheptane, tricyclodecane, hexahydroindene and cyclooctane; aromatic hydrocarbons such as benzene, toluene and xylene; and nitrogen-containing hydrocarbons such as nitromethane, nitrobenzene and acetonitrile; oxygen-containing hydrocarbons such as diethyl ether and tetrahydrofuran. Among them, preferably used are an aromatic hydrocarbon, aliphatic hydrocarbon and an alicyclic hydrocarbon, which are generally used in industries. Further, any of functional liquid compounds contributing to a performance of a molded product such as a liquid antioxidant, a liquid plasticizer and a liquid elastomer may be used as the inert solvent insofar as it does not lower the catalytic activity of the ruthenium catalyst.

A polymerization activator (cocatalyst) or a polymerization retarder can be mixed into the polymerizable composition for the purposes to adjust a polymerization activity of the metathesis polymerization catalyst or to increase a polymerization reaction ratio. Examples of the polymerization activator include: (partial) alkylation products, (partial) halogenation products, (partial) alkoxylation products and (partial) aryloxylation products of aluminum, scandium, tin, titanium, and zirconium.

Specific examples of the polymerization activator include: trialcoxyaluminum, triphenoxyaluminum, dialcoxyalkylaluminum, alcoxy dialkylaluminum, trialkylaluminum, dialcoxyaluminum chloride, alcoxy alkylaluminum chloride, dialkylaluminum chloride, trialcoxyscandium, tetraalcoxytitanium, tetraalcoxytin and tetraalcoxyzirconium.

Examples of the polymerization retarder include: acyclic diene compounds such as 1,5-hexadiene, 2,5-dimethyl-1,5-hexadiene, (cis,cis)-2,6-octadiene, (cis,trans)-2,6-octadiene, and (trans,trans)-2,6-octadiene; acyclic triene compounds such as (trans)-1,3,5-hexatriene, (cis)-1,3,5-hexatriene, (trans)-2,5-dimethyl-1,3,5-hexatriene and (cis)-2,5-dimethyl-1,3,5-hexatriene; phosphines such as triphenylphosphine, tri-n-butylphosphine and methyldiphenylphosphine; and Lewis bases such as aniline.

A cycloolefin monomer having a diene structure or a triene structure in the ring can be used as the polymerization retarder. Examples of the cycloolefin monomer include: monocycloolefins such as 1,5-cyclooctadiene, 1,5-dimethyl-1,5-cyclooctadiene, 1,3,5-cycloheptatriene and (cis,trans,trans)-1,5,9-cyclododecatriene. Since the cycloolefin having a diene structure or a triene structure in the ring is a polymerization retarder and at the same time a cycloolefin monomer, the cycloolefin can be used as part of a cycloolefin monomer having a diene structure or a triene structure in the ring and at the same time can also functions as a polymerization retarder.

The amount of the polymerization activator or the polymerization retarder can be set arbitrarily depending on the used compound and the object, and usually in the range of 1:0.05 to 1:100, preferably in the range of 1:0.2 to 1:20 and more preferably in the range of from 1:0.5 to 1:10, in terms of (transition metal atom in the metathesis polymerization catalyst: the polymerization activator or the polymerization retarder).

The cycloolefin resin (A) in the invention can be obtained by ring-opening polymerizing the cycloolefin monomer using the metathesis polymerization catalyst in the presence of the compound having two or more vinyl groups in the molecule described above. The polymerization reaction may be either solution polymerization conducted in a solvent or ring-opening bulk polymerization. Preferable is ring-opening bulk polymerization since the molded product is obtained at the same time as polymerization, and ring-opening bulk polymerization is excellent in productivity as well as being capable of decreasing the amount of the residual solvent in the cycloolefin resin (A)

Hereinafter, a method for obtaining the cycloolefin resin (A) obtained by ring-opening bulk polymerization and the crosslinkable resin composition including the same is explained. A method for producing a cycloolefin resin (A) by solution polymerization and obtaining the crosslinkable resin composition containing the cycloolefin (A) and the radical generating agent is explained later.

The polymerizable composition can be obtained by mixing the radical generating agent (B) into the composition composed of the cycloolefin monomer, the compound having two or more vinyl groups in the molecule and the metathesis polymerization catalyst. Then, the polymerizable composition is subjected to ring-opening bulk polymerization to thereby enable the crosslinkable resin composition to be directly obtained. Additives described later can also be mixed into the polymerizable composition or the crosslinkable resin composition.

The radical generating agent (B) used in the invention is a compound which can produce a crosslinking structure by reacting with the carbon-carbon double bond such as a terminal vinyl group of the cycloolefin resin by crosslinking reaction.

Examples of the radical generating agent (B) include an organic peroxide or a diazo compound. Examples of the organic peroxide include: hydroperoxides such as t-butyl hydroperoxide, p-menthane hydroperoxide, cumene hydroperoxide; dialkyl peroxides such as dicumyl peroxide, t-butyl cumyl peroxide, α,α'-bis(t-butylperoxy-m-isopropyl)benzene, di-t-butyl peroxide, 2,5-dimethyl-2,5-di(t-butylperoxy)hexane and 2,5-dimethyl-2,5-di(t-butylperoxy)hexine-3; diacyl peroxides such as dipropionyl peroxide and benzoyl peroxide; peroxyketals such as 2,5-dimethyl-2,5-di(t-butylperoxy)hexane, 2,5-dimethyl-2,5-di(t-butylperoxy)hexine-3 and 1,3-di(t-butylperoxyisopropyl)benzene; peroxyesters such as t-butylperoxyacetate and t-butylperoxybenzoate; ketone peroxides such as peroxycarbonates including t-butylperoxyisopropyl carbonate and di(isopropylperoxy) dicarbonate; and alkylsilyl peroxides such as t-butyl trimethylsilyl peroxide. Among them, for the bulk polymerization, preferable is dialkyl peroxide since the hindrance against the metathesis polymerization reaction is lower.

Examples of the diazo compound include: 4,4'-bisazidobenzal(4-methyl)cyclohexanone, 4,4'-diazidochalcone, 2,6-bis(4'-azidobenzal)cyclohexanone, 2,6-bis(4'-azidobenzal)-4-methylcyclohexanone, 4,4'-diazidophenylsulfon, 4,4'-diazidodiphenylmethane and 2,2'-diazidostilbene.

The amount of the radical generating agent is usually in the range of from 0.1 to 10 parts by weight and preferably in the range of from 0.5 to 5 parts by weight relative to 100 parts by weight of the cycloolefin monomer. If the amount of the radical generating agent is low, the crosslinking may be insufficient and the crosslinked resin molded product with a high crosslinking density may not be obtained. If the amount of the radical generating agent is too high, the crosslinking effect may be saturated and the crosslinked resin molded product having desired physical properties may not be obtained.

Further mixing of a radical crosslinking retarder into the polymerizable composition is preferable since fluidity and a storage stability of the crosslinkable resin composition can be improved.

Examples of the radical crosslinking retarder include: hydroxyanisoles such as 3-t-butyl-4-hydroxyanisole, 2-t-butyl-4-hydroxyanisole, 3,5-di-t-butyl-4-hydroxyanisole, 2,5-di-t-butyl-4-hydroxyanisole, bis-1,2-(3,5-di-t-butyl-4-hydroxyphenoxy)ethane; dialkoxyphenols such as 2,6- dimethoxy-4-methylphenol and 2,4-dimethoxy-6-t-butylphenol; catechols such as catechol, 4-t-butyl catechol and 3,5-di-t-butyl catechol; and benzoquinones such as benzoquinone, naphthoquinone and methylbenzoquinone. Among them, preferable are hydroxyanisoles, catechols and benzoquinones and especially preferable is hydroxyanisoles.

The amount of the radical crosslinking retarder is usually in the range of from 0.001 to 1 mol and preferably in the range of from 0.01 to 1 mol relative to one mole of the radical generating agent.

The resin molded product made of the crosslinkable resin composition can be obtained with such the polymerizable composition. The following methods are exemplified as methods for obtaining a resin molded product.

(a) A method of coating the polymerizable composition onto a supporting body such as a film and conducting ring-opening polymerization by heating to a predetermined temperature.

(b) A method of impregnating a fiber reinforcement in the shape of sheet with the polymerizable composition and conducting ring-opening polymerization by heating to a predetermined temperature.

(c) A method of injecting the polymerizable composition into a cavity of a forming mold and conducting ring-opening polymerization by heating to a predetermined temperature.

According to the method (a), a resin film can be obtained. A metal foil or a resin substrate is preferably used as the supporting body. Examples of the supporting body include: the resin substrates made of resins such as polyethylene terephthalate, polypropylene, polyethylene, polycarbonate, polyethylene naphthalate, polyallylate and Nylon; and the metal foils made of metal materials such as iron, stainless steel, copper, aluminum, nickel, chromium, gold and silver. Besides, a glass fiber reinforced resin thin film such as a glass reinforced polytetrafluoroethylene resin (PTFE resin) film can also be used as the resin substrate.

The thickness of the metal foil or the resin substrate is usually in the range of from 1 to 150 µm, preferably in the range of from 2 to 100 µm, and more preferably in the range of from 3 to 75 µm from the viewpoint of workability.

The methods for coating the polymerizable composition on the supporting body are not particularly limited, but there are known methods such as a spray coating method, a dip coating method, a roll coating method, a curtain coating method, a die coating method, a slit coating method.

The methods for heating the polymerizable composition to the predetermined temperature are not particularly limited, but there are a method for heating the supporting body placed on a heating plate, a method for heating under a pressure (heat pressing) using a press machine, a method for pressing by using a heated roller, and a method using a heating furnace.

The thickness of the resin film obtained in the above method is generally 15 mm or less, preferably 10 mm or less and even more preferably 5 mm or less.

When the metal foil is used as the supporting body, a resin laminated metal foil can be obtained.

According to the method (b), for example, a fiber reinforced resin film can be obtained. This can be used as a so-called prepreg.

The fiber reinforcement is a fiber in the shape of sheet made of organic and/or inorganic material. Examples of the fiber include known fibers such as a glass fiber (such as a glass cloth and a glass nonwoven fabric cloth), a carbon fiber, an aramid fiber, a polyethylene terephthalate fiber, a vinylon fiber, a polyester fiber, an amide fiber, a metal fiber, and a ceramic fiber. These can be used either alone or in combination of two or more. Examples of the fiber reinforcement in the shape of sheet include a mat, a cloth and a nonwoven fabric.

The method for impregnating the fiber reinforcement with the polymerizable composition includes, for example, a method in which a predetermined amount of the polymerizable composition is poured over the fiber reinforcement such as a cloth or a mat, a protective film is if necessary laminated on the wet coated fiber reinforcement, and pressing the wet coated fiber reinforcement using a roller from the upper side. By heating the impregnated product at the predetermined temperature and conducting ring-opening bulk polymerization, the fiber reinforced resin film is obtained The method for heating the impregnated product is not particularly limited, but the same method as the method (a) can be adopted. The impregnated product may be placed on the supporting body and heated in this state. Besides, the fiber reinforced resin film can be obtained by ring-opening bulk polymerization according to the method (c) described below. In that case, the fiber reinforcement may be placed in the mold frame and impregnated with the polymerizable composition in advance of polymerization.

According to the method (b), the fiber reinforcement is impregnated with the polymerizable-state composition; therefore, the speed of impregnation is faster than that of impregnation with a resin solution, and the fiber reinforced resin film with a high resin concentration can be obtained. Also, since the polymerizable composition of the invention does not require a solvent therein, the process makes a conventional step of removing the solvent after impregnation with a resin varnish unnecessary; therefore, the process is excellent in productivity and does not cause a problem associated with a residual solvent. Moreover, in the invention, since polymerization is a metathesis reaction, while crosslinking is a radical reaction, wherein both reactions are different in reaction mechanism from each other, it is possible to control the reactions so as to progress in different temperature condition; therefore, the fiber reinforced resin film excellent in storage stability can be obtained.

According to the method (c), resin molded products in various shapes can be obtained. The shape of the resin molded product is not particularly limited. For example, a film, a cylinder, a prism and other shapes can be cited.

As the mold used, a conventional known mold, for example, a split mold, that is, a core mold and a cavity mold can be used, and the reaction solution is injected into a gap (cavity) therebetween and subjected to bulk polymerization. The core mold and cavity mold are produced so as to form a gap adapted to the shape of the objective molded product. The shape, material and size of the mold are not particularly limited. Besides, a plate-shaped mold such as a glass plate or a metal plate and a spacer with a predetermined thickness are prepared, the polymerizable composition is injected into a space formed between two plate-shaped molds via the spacer, the resin molded product in the shape of film can be obtained.

The charging pressure (injection pressure) at which the cavity is charged with the polymerizable composition is usually 0.01 to 10 MPa, preferably 0.02 to 5 MPa. When the charging pressure is too low, a transfer face formed on the inner periphery of the cavity tends to be not excellently transferred, while when the charging pressure is too high, the rigidity of the mold should be higher, which is not economical. The clamping pressure is usually in the range of 0.01 to 10 MPa.

In any of the above methods (a), (b) and (c), a heating temperature at which the polymerizable composition (in method (c), metal mold temperature) is polymerized is usually in the range of from 30 to 250° C. and preferably in the range of from 50 to 200° C. The polymerization time may be properly selected; the time is usually in the range of from 10 seconds to 20 minutes and preferably in the range of from 10 seconds to 5 minutes.

The polymerizable composition is heated at a predetermined temperature to thereby start the polymerization reaction. This polymerization reaction is an exothermic reaction and once the reaction gets started, the temperature of the composition rapidly rises and reaches the peak temperature in a short time (for example, about 10 seconds to 5 minutes).

If the peak temperature during the polymerization reaction is too high, not only the polymerization reaction but also the crosslinking reaction progress, thereby the crosslinkable resin molded product may not be obtained. In order to advance only the polymerization reaction completely without advancing the crosslinking reaction, it is required that the peak temperature during the polymerization reaction is necessary to be controlled lower than 230° C. in general, preferably, at a temperature lower than 200° C.

The peak temperature during the polymerization reaction differs depending on the kind of the radical generating agents, it is preferably at a temperature equal to or lower than one minute half-life temperature of the radical generating agent. Herein, the term "one minute half-life temperature" means the temperature at which a half of the original amount of the radical generating agent decomposes in one minute. For example, in the case of di-t-butyl peroxide, the temperature is 186° C. and in the case of 2,5-dimethyl-2,5-bis (t-butylperoxy)-3-hexine, the temperature is 194° C.

In order to prevent overheating caused by the heat of the polymerization reaction, the polymerization reaction retarder may be added into the polymerizable composition, thereby also enabling the reaction to progress slowly.

Then, a method, in which the cycloolefin resin (A) is obtained by solution polymerization and thereafter, the crosslinkable resin composition is obtained, is explained.

In the solution polymerization, the cycloolefin monomer is metathesis polymerized in a solvent. The concentration of the cycloolefin monomer is preferably in the range of from 1 to 50% by weight, more preferably in the range of from 2 to 45% by weight and especially preferably in the range of from 5 to 40% by weight. If the concentration of the cycloolefin monomer is too low, the productivity may lower, while if the concentration of the cycloolefin is too high, the viscosity after polymerization may be too high, which makes a post processing difficult. The reaction temperature in the solution polymerization is not particularly limited, but the reaction temperature therein is generally in the range of from −30° C. to 200° C. and preferably in the range of from 0° C. to 180° C. The polymerization reaction time is generally in the range of from 1 minute to 100 hours, but no specific limitation is placed thereon.

The solvent used in the solution polymerization is not particularly limited, insofar as it dissolves the polymer produced and gives no hindrance to polymerization. Specific examples of the solvent include: aliphatic hydrocarbons such as pentane, hexane and heptane; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene and cyclooctane; aromatic hydrocarbons such as benzene, toluene and xylene; nitrogen-containing hydrocarbons such as nitromethane, nitrobenzene and acetonitrile; ethers such as diethyl ether and tetrahydrofuran; and halogen-containing hydrocarbons such as chloroform, dichloromethane, chlorobenzene and dichlorobenzene. Among the solvents, preferably are aromatic hydrocarbons, aliphatic hydrocarbons, alicyclic hydrocarbons and ethers, and most preferably used are alicyclic hydrocarbons such as cyclohexane from the viewpoint of inertness in the polymerization reaction and excellency in dissolubility of a polymer.

The cycloolefin resin (A) obtained by the solution polymerization can be desirably used without hydrogenation. When the cycloolefin resin (A) is hydrogenated, the hydrogenation ratio is suppressed to be at low level so that a terminal vinyl group high in radical crosslinking reactivity is not lost. Therefore, the hydrogenation ratio is desirably restricted to a value of 50% or less.

The polymerization solution is, after the solution polymerization is over, rendered in contact with a poor solvent of the cycloolefin resin (A) to precipitate the polymer and the polymer is dried to obtain the target resin. The poor solvent is selected properly depending on a kind of the cycloolefin resin and alcohols such as ethanol, methanol and isopropyl alcohol; and ketones such as acetone and methyl ethyl ketone are usually used.

A varnish can be obtained by dissolving the cycloolefin resin (A), the radical generating agent (B) described above and additives described later if necessary.

The solvent used for preparing the vanish in this case is not specifically limited, insofar as it dissolve the cycloolefin (A). The solvent in the varnish is dried and removed to obtain the crosslinkable resin composition of the invention. The resin molded product can be obtained by combining the crosslinkable resin composition with different materials (such as the reinforcing material or the metal foil). For example, when the reinforcing material such as a glass cloth is impregnated with a varnish and thereafter, the solvent in the varnish is removed by drying, the prepreg is obtained, while when the varnish is coated on the metal foil and thereafter, the solvent is removed by drying, the resin laminated metal foil is obtained.

The molecular weight of the cycloolefin resin (A) obtained by the method described above is usually in the range of from 1,000 to 1,000,000, preferably in the range of from 5,000 to 500,000 and more preferably in the range of from 10,000 to 250,000 in weight average molecular weight (Mw) in terms of polystyrene as measured by a gel permeation chromatography (GPC). If the weight average molecular weight (Mw) thereof is too small, the crosslinked resin molded product become reduced in heat resistance and mechanical characteristics, while the weight average molecular weight thereof is too large, the fluidity of the crosslinkable resin composition is degraded when being heated.

The glass transition temperature of the cycloolefin resin (A) can be selected properly so as to be adapted for the purpose of use, but usually adopted in the range of from 50° C. to 250° C. and preferably adopted in the range of from 100° C. to 200° C.

The additives which may be incorporated to the polymerizable composition or the crosslinkable resin composition include, for example, a reinforcing material, a modifier, an antioxidant, a filler, a colorant, a light stabilizer, and a flame retardant.

Examples of the reinforcing material include a glass fiber, and a paper substrate. Examples of the modifier include elastomers such as natural rubber, polybutadiene, polyisoprene, styrene-butadiene copolymer (SBR), styrene-butadiene-styrene block copolymer (SBS), styrene-isoprene-styrene copolymer, (SIS), ethylene-propylene-diene terpolmyer (EPDM), ethylene-vinyl acetate copolymer (EVA) and hydrogenated product of the described above. Examples of the antioxidant include: various kinds of antioxidants for plastics and rubbers such as a hindered phenol type, a phosphorus type, an amine type and the like.

Examples of the filler include: inorganic fillers such as glass powder, carbon black, silica, talc, calcium carbonate, mica, alumina, titanium dioxide, zirconia, mullite, cordierite, magnesia, clay, barium sulfate; and organic fillers such as wood powder and polyethylene powder. Conductivity and an electromagnetic wave shielding effect can be improved by using graphite powder, wood charcoal, bamboo charcoal, metal powder and the like. Specific inductive capacity can be increased by using powder of barium titanate, strontium titanate, lead titanate, magnesium titanate, bismuth titanate, lead zirconate or the like. Ferromagnetic property can be conferred by using ferrites such as Mn—Mg—Zn ferrite, Ni—Zn ferrite and Mn—Zn ferrite; and powder of ferromagnetic metals such as carbonyl iron, iron-silicon alloy, iron-aluminum-silicon alloy and iron-nickel alloy. Besides, the filler treated surface thereof with a silane coupling agent or the like can also be used.

As the colorant, dye, pigment or the like are used. There are various kinds of dye available and those known widely can be appropriately used. Examples of the pigment include carbon black, graphite, chrome yellow, iron oxide yellow, titanate dioxide, zinc oxide, trilead tetraoixde, red lead, chromium oxide, Berlin blue, titanium black and the like. Examples of the light stabilizer include a benzotriazole ultraviolet absorbent, a benzophenone ultraviolet absorbent, a sulicylate ultraviolet absorbent, a cyanoacrylate ultraviolet absorbent, an oxanilide ultraviolet absorbent, a hindered amine based ultraviolet absorbent, a benzoate ultraviolet absorbent and the like.

Examples of the flame retardant include: a phosphorus-containing flame retardant, a nitrogen-containing flame retardant, a halogen-containing flame retardant, flame retardants each containing a metal hydroxide such as an aluminum hydroxide or a magnesium hydroxide.

The amount of the additive can be set properly for the purpose of use, but is usually in the range of from 0.001 to 1000 parts by weight relative to 100 parts by weight of the cycloolefin monomer or the cycloolefin resin.

The crosslinkable resin composition and the molded product of the invention described above can be crosslinked by heating. In order to obtain the crosslinked resin molded product using the resin molded product made of the crosslinkable resin composition, the reaction temperature can be set according to the temperature of crosslinking of the crosslinkable resin composition. When the crosslinkable resin composition is prepared by bulk polymerization, the temperature adopted in crosslinking is preferably the peak temperature during the bulk polymerization reaction or higher, and more preferably the temperature higher than the peak temperature by 20° C. or more. The heating temperature during crosslinking is usually in the range of from 150 to 250° C. and preferably in the range of from 180 to 220° C. The time of heating or crosslinking is not particularly limited, but is usually adopted in the range of from several minutes to a few hours.

When the crosslinkable resin composition is a molded product in the shape of film, the method is preferably adopted in which the molded products are laminated and heat pressed, if necessary. The pressure when the laminate is heat pressed is usually in the range of from 0.5 to 20 MPa and preferably in the range of from 3 to 10 MPa. Examples of the heat pressing method include a method using a known press machine having a press frame for plate molding and a method using a press molding machine such as sheet mold compound (SMC) and bulk mold compound (BMC). These methods is excellent in productivity.

It is also obtained the crosslinked resin molded product in which the crosslinkable resin composition and the different material are combined by laminating these while heating the crosslinkable resin composition. Examples of the different material include: metal foils such as a copper foil, an aluminum foil, a nickel foil, a chromium foil, a gold foil and a silver foil; substrates such as a substrate for producing a printed wiring board; and films such as a conductive polymer film and other resin films. When the resin molded product is manufactured by the method (a), the supporting body as is may be used as the different material.

When a substrate is employed as the different material, it is also preferable for manufacturing a multilayer printed wiring board. The substrate is not particularly limited insofar it is used for common printed wiring board. For example, a multilayer printed wiring board can be produced by laminating an outer layer material (single sided copper clad laminate or the like) and an inner layer material (double-sided printed wiring board or the like) via the prepreg and heating the prepreg under a pressure. A build-up multilayer printed wiring board can be produced by laminating the resin laminated metal foil and an inner layer material (double-sided printed wiring board or the like) via the prepreg and heating the prepreg under a pressure.

EXAMPLES

The invention is explained in detail below showing examples and comparative examples, to which examples the invention is not limited.

Example 1

Put into a 30 ml glass bottle were 7.5 g of tetracyclo [6.2.1.1$^{3,6}$.0$^{2,7}$]dodec-4-ene, 2.5 g of 2-norbornene, 0.12 g of divinylbenzene (with a purity of 55%, a mixture of m- and p-divinylbenzenes, manufactured by Tokyo Kasei Kogyo Co., Ltd., including ethylvinylbenzene and diethylbenzene as impurities), 0.11 g of α,α'-bis(t-butylperoxy)diisopropylbenzene (one minute half-life temperature of 175° C.), and 0.04 ml of a 0.05 mol/l benzylidene (1,3-dimesitylimidazolidin-2-ylidene) (tricyclohexylphosphine) ruthenium dichloride toluene solution (including triphenylphosphine at 0.25 mol/l) and the mixture was stirred to prepare a polymerizable composition.

The polymerizable composition was injected into a metal mold for flat plate (the mold in a structure that a spacer with a thickness of 0.55 mm in the shape of framed rectangle was sandwiched between two iron plates each with a thickness of 1 mm), and the metal mold containing the injected polymerizable composition was sandwiched in a heat press at 145° C. and heated for 3 minutes for polymerizing to obtain a resin molded product made of the crosslinkable resin composition. Part of the resin molded product was dissolved into tetrahydrofuran and the weight average molecular weight (Mw) in terms of monodisperse polystyrene was measured by gel permeation chromatography (GPC), The result is shown in Table 1. Moreover, a residual monomer amount relative to the crosslinkable resin composition was measured with the tetrahydrofuran solution thereof by a gas chromatography (GC). The result of which is also shown in Table 1.

Two sheets of resin molded products made of the crosslinkable resin composition were laminated and put into a metal mold for laminates (the mold in a structure that a spacer with a thickness of 1 mm in the shape of framed rectangle was sandwiched between two iron plates each with a thickness of 1 mm), and the metal mold containing two resin molded products was sandwiched in a heat press at 200° C. and heated for 15 minutes to obtain a crosslinked resin molded product. The glass transition temperature (Tig) of the resin of the crosslinked resin molded product was measured with a differential scanning calorimeter (DSC). The result is shown in Table 1. A disc-shaped sample with a diameter of 10 mm was cut off from the crosslinked resin molded product, immersed in toluene at 23° C. for 24 hours and thereafter, the sample was dried at 60° C. for 4 hours with a vacuum drier to measure a weight after the drying and to obtain a percentage of the weight relative to the initial weight thereof (hereinafter referred to as a residual percentage). The result is shown in Table 1. Besides, in Table 1, there is shown whether or not the crosslinked molded product was deformed in 20 seconds in a state of being floated on a solder bath at 260° C.

Example 2

The molded product was obtained and evaluated in the same manner as in Example 1 with the exception that 0.20 g of triallyl isocyanurate was used instead of 0.12 g of divinylbenzene, results of which are shown in Table 1.

Comparative Example 1

The molded product was obtained and evaluated in the same manner as in Example 1 with the exception that 0.12 g of styrene was used instead of 0.12 g of divinylbenzene, results of which are shown in Table 1.

TABLE 1

| | Chain transfer agents | Resin Mw | Residual monomer | Tig (° C.) | Residual percent- age (%) | Solder dip resis- tance |
|---|---|---|---|---|---|---|
| Example 1 | divinyl- benzene (0.12 g) | 43900 | 1.2% | 128 | 68 | not deformed |
| Example 2 | triallyl isocyan- urate (0.2 g) | 41700 | 0.7% | 131 | 59 | not deformed |
| Com- parative Example 1 | styrene (0.12 g) | 46000 | 2.1% | 128 | 37 | deformed |

Example 3

Put into a 30 ml glass bottle were 42 mg of 3,5-di-t-butylhydroxyanisole, 11.3 g of tetracyclo[6.2.1.1$^{3,6}$.0$^{2,7}$] dodec-4-ene, 3.7 g of 2-norbornene, 0.45 g of 5-vinyl-2-norbornene, 0.30 g of 1,5-hexadiene, 0.17 g of di-t-butyl peroxide (one minute half-life temperature of 186° C.), and 0.06 ml of a 0.05 mol/l benzylidene (1,3-dimesitylimidazolidin-2-ylidene) (tricyclohexylphosphine)ruthenium dichloride/toluene solution (including triphenylphosphine at 0.25 mol/l) and the mixture was stirred to prepare a polymerizable composition.

Two glass cloths (cut off each in size of 200 mm×200 mm with a thickness of 0.174 mm, with a trade name 7628/ AS891AW, manufactured by ASAHI-SHWEBEL CO., LTD) were placed on a glass fiber reinforced PTFE resin film (cut off in size of 300 mm×300 mm, with a thickness of 0.08 mm, with a product number 5310, manufactured by SAINT-GOBAIN KK), the polymerizable composition was poured over the glass cloths, another sheet of the glass fiber reinforced PTFE resin film, same as the above, was laminated thereon and then the laminate was press rolled to be impregnated with the polymerizable composition.

Then, the laminate was placed on a hot plate heated at 145° C. for 1 minute to polymerize the monomer impregnated in the laminate. Thereafter, the two glass fiber reinforced PTFE resin film adhered to the both surface of the laminate were peeled off to obtain a prepreg, which is a resin molded product.

The resin portion of the prepreg was dissolved into tetrahydrofuran and the weight average molecular weight (Mw) in terms of polystyrene was measured by gel permeation chromatography (GPC). The result was 25,600.

One drop of acetic acid was added into 60 g of distilled water and 0.18 g styryltrimethoxysilane (with a trade name of KEM-1403, manufactured by Shin-Etsu Chemical Co., Ltd.) was added. The mixture was stirred for 1 hour to hydrolyze and dissolve thereof and a silane coupling agent solution was obtained. The silane coupling agent solution was coated, by using an absorbent cotton, on a rough surface of an electrodeposited copper foil (a rough surface GTS treated product, with a thickness of 0.018 mm, manufactured by FURUKAWA CIRCUIT FOIL Co., Ltd.), followed by drying the coat in a nitrogen atmosphere at 130° C. for 1 hour.

Three sheets of above prepreg (each sheet was cut off in size of 87 mm×87 mm) were put into a mold frame (having a thickness of 1 mm, in the shape of framed rectangle, in size of 90 mm×90 mm) and sandwiched by using the electrodeposited copper foil (a rough surface of which was in contact with a prepreg) and a PTFE film with a thickness of 0.05 mm. In this state the laminate was heat pressed under a press pressure of 4.1 MPa at 200° C. for 15 minutes. Thereafter, the heat-pressed laminate was cooled while being kept under the press pressure and the laminate was taken out from the press after the temperature was cooled down to 100° C. or less to thereby obtain a single side copper clad laminate, which was a crosslinked resin molded product. The inter-layer adherence of the single sided copper clad laminate was visually confirmed. Specifically, the single sided copper clad laminate was observed from the side opposite to the copper foil surface to thereby obtain a percentage of a white area where no adhesion occurs between layers relative to the entire area thereof (hereinafter referred to as a whitening percentage). The result was 0%.

The glass transition temperature (Tig) of resin portion of the single sided copper clad laminate was measured according to the JIS measurement method C 6481 by differential scanning calorimeter (DSS). The result was 107° C. The solder dip resistance test (the JIS method C 6481 using a solder bath at 260° C. for 20 seconds) was applied thereto with a result of neither swell nor peel.

Comparative Example 2

The prepreg was obtained and evaluated in the same manner as in Example 3 except that 0.30 g of 1-hexene was used instead of 0.30 g of 1,5-hexadiene.

The weight average molecular weight (Mw) of the prepreg was 26,400 in terms of polystyrene. The Tig of the resin portion of the single sided copper clad laminate was 110° C. The whitening percentage was 0%. The swell occurs in a solder dip resistance test.

Comparative Example 3

The prepreg was obtained and evaluated in the same manner as in Example 3 except that 0.15 g of 1-hexene was used instead of 0.30 g of 1,5-hexadiene.

The weight average molecular weight (Mw) of the prepreg was 53,000 in terms of polystyrene. The Tig of a resin portion of a single sided copper clad laminate was 111° C. The whitening percentage was 42%. In a solder dip resistance test on a portion where no whitening arises, neither swell nor peel occurs.

From the results, it is understood that although the Mws of crosslinkable resins comprising the resin molded products in Examples 1 and 2 were smaller than that of Comparative Examples, the residual percentage of the crosslinked resin in the crosslinked resin molded product and the solder dip resistance in Examples 1 and 2 were better than Comparative Examples.

In Example 3, 1,5-hexadiene was employed as the chain transfer agent to thereby render interlayer adherence and solder dip resistance compatible with each other. On the other hand, in Comparative Example 2, the chain transfer agent was changed to 1-hexene to thereby render crosslinking insufficient and deteriorate the solder dip resistance. In Comparative Example 3, the molecular weight of the crosslinked resin is raised by reducing the amount of 1-hexene to thereby improve the solder dip resistance, but to degrade interlayer adherence in company therewith. That is, when 1-hexene is employed as a chain transfer agent, no compatibility was established between a solder dip resistance and an interlayer adherence.

The invention claimed is:

1. A crosslinkable resin composition comprising:
   a cycloolefin resin (A) obtained by ring-opening metathesis polymerizing a cycloolefin monomer in the presence of 0.1 to 10 parts by weight, relative to 100 parts by weight of the cycloolefin monomer, of a compound having two or more vinyl groups in a molecule, and a radical generating agent (B).

2. The crosslinkable resin composition according to claim 1, obtained by ring-opening bulk polymerizing a polymerizable composition comprising the cycloolefin monomer, the radical generating agent (B), the compound having two or more vinyl groups in the molecule and a metathesis polymerization catalyst.

3. A resin molded product made of the crosslinkable resin composition according to claim 1.

4. A method for producing a resin molded product manufacturing the resin molded product of claim 3, wherein a polymerizable composition comprising the cycloolefin monomer, the radical generating agent (B), the compound having two or more vinyl groups in the molecule and a metathesis polymerization catalyst is coated on a supporting body, followed by ring-opening polymerizing the polymerizable composition coated.

5. A method for producing a resin molded product manufacturing the resin molded product of claim 3, wherein a fiber reinforcement is impregnated with a polymerizable composition comprising the cycloolefin monomer, the radical generating agent (B), the compound having two or more vinyl groups in the molecule and a metathesis polymerization catalyst, followed by ring-opening polymerizing the polymerizable composition.

6. A method for producing a resin molded product manufacturing the resin molded product of claim 3, wherein a polymerizable composition comprising the cycloolefin monomer, the radical generating agent (B), the compound having two or more vinyl groups in the molecule and a metathesis polymerization catalyst is injected into a cavity in a mold, followed by ring-opening polymerizing the polymerizable composition injected.

7. A crosslinked resin molded product produced by heating and crosslinking the resin molded product according to claim 3.

* * * * *